(12) United States Patent
Fleming et al.

(10) Patent No.: US 12,172,766 B2
(45) Date of Patent: Dec. 24, 2024

(54) COWLING LATCH INTERLOCK MECHANISM

(71) Applicant: The Boeing Company, Arlington, VA (US)

(72) Inventors: Michael A. Fleming, Bellevue, WA (US); Dale G. Frolander, Everett, WA (US); Lauren Peter Yoshiba, Long Beach, CA (US); Andrew R. Croskey, Summerville, SC (US); Albert P. Go, Cambridge, MA (US); Rohith R. Birjay, Bengaluru (IN); Jeremiah D. Langston, Summerville, SC (US); Declan Foley, Summerville, SC (US); Ignacio J. Carrillo, Ladson, SC (US)

(73) Assignee: The Boeing Company, Arlington, VA (US)

( * ) Notice: Subject to any disclaimer, the term of this patent is extended or adjusted under 35 U.S.C. 154(b) by 4 days.

(21) Appl. No.: 18/312,342

(22) Filed: May 4, 2023

(65) Prior Publication Data

US 2024/0367806 A1  Nov. 7, 2024

(51) Int. Cl.
B64D 29/06 (2006.01)
B64D 29/08 (2006.01)

(52) U.S. Cl.
CPC .............. B64D 29/06 (2013.01); B64D 29/08 (2013.01)

(58) Field of Classification Search
CPC ......... B64D 29/06; B64D 29/08; F02K 1/766; F02K 1/80
See application file for complete search history.

(56) References Cited

U.S. PATENT DOCUMENTS

| | | | |
|---|---|---|---|
| 4,549,708 A | 10/1985 | Norris | |
| 5,518,206 A | 5/1996 | Arnold et al. | |
| 5,915,765 A | 6/1999 | Sternberger | |
| 10,710,736 B2 | 7/2020 | Fleming et al. | |
| 2010/0284806 A1 | 11/2010 | Vauchel et al. | |
| 2011/0116916 A1* | 5/2011 | Porte ...................... | B64D 29/06 |
| | | | 415/201 |

(Continued)

OTHER PUBLICATIONS

European Patent Office, Extended European Search Report Issued in Application No. 24173274.2 Aug. 22, 2024, Germany, 7 pages.

*Primary Examiner* — Andrew H Nguyen
(74) *Attorney, Agent, or Firm* — Alleman Hall & Tuttle LLP

(57) ABSTRACT

An aircraft engine cowling comprises a first cowling portion and a second cowling portion moveable relative to each other. A cowling latch secures the first cowling portion and the second cowling portion in a closed position. The aircraft engine cowling further comprises a deflection limiter band and a deflection limiter latch moveable between an engaged state and a disengaged state for the deflection limiter band. An interlock mechanism prevents disengagement of the cowling latch while the deflection limiter latch is in the engaged state. The interlock mechanism includes a lock element moveable between a first position that prevents disengagement of the cowling latch and a second position that enables disengagement of the cowling latch. The interlock mechanism also includes an indicator paddle movable to contact the deflection limiter latch. A linkage assembly coordinates movement of the lock element with movement of the indicator paddle.

20 Claims, 10 Drawing Sheets

(56) References Cited

U.S. PATENT DOCUMENTS

| | | |
|---|---|---|
| 2018/0171664 A1 | 6/2018 | Frommer et al. |
| 2019/0127075 A1* | 5/2019 | Fleming ................. B64D 29/06 |
| 2020/0031484 A1* | 1/2020 | Thomas ................ E05B 13/001 |

* cited by examiner

```
                                    900

┌─────────────────────────────────────────────────────────────────────┐
│ DISENGAGE AT LEAST ONE DEFLECTION LIMITER LATCH FOR A DEFLECTION    │
│ LIMITER BAND HOUSED WITHIN THE AIRCRAFT ENGINE COWLING TO MOVE THE  │
│ DEFLECTION LIMITER LATCH AWAY FROM CONTACT WITH AN INDICATOR        │
│ PADDLE OF AN INTERLOCK MECHANISM 902                                │
├─────────────────────────────────────────────────────────────────────┤
│ DISENGAGE A SECOND DEFLECTION LIMITER LATCH FOR THE DEFLECTION      │
│ LIMITER BAND TO MOVE THE SECOND DEFLECTION LIMITER LATCH AWAY       │
│ FROM CONTACT WITH AN INDICATOR PADDLE OF A SECOND INTERLOCK         │
│ MECHANISM 904                                                       │
└─────────────────────────────────────────────────────────────────────┘
                                    │
                                    ▼
┌─────────────────────────────────────────────────────────────────────┐
│ MOVE A LOCK ELEMENT OF THE INTERLOCK MECHANISM THAT AT LEAST        │
│ PARTIALLY COVERS A COWLING LATCH AND THAT IS COUPLED TO THE         │
│ INDICATOR PADDLE VIA A LINKAGE ASSEMBLY FROM A FIRST POSITION THAT  │
│ PREVENTS DISENGAGEMENT OF THE COWLING LATCH TO A SECOND POSITION    │
│ THAT ENABLES DISENGAGEMENT OF THE COWLING LATCH, WHEREIN THE        │
│ COWLING LATCH SECURES A FIRST COWLING PORTION AND A SECOND          │
│ COWLING PORTION IN A CLOSED POSITION 906                            │
├─────────────────────────────────────────────────────────────────────┤
│ MOVE A LOCK ELEMENT OF A SECOND INTERLOCK MECHANISM THAT AT         │
│ LEAST PARTIALLY COVERS THE COWLING LATCH AND THAT IS COUPLED        │
│ TO THE INDICATOR PADDLE OF THE SECOND INTERLOCK MECHANISM VIA A     │
│ LINKAGE ASSEMBLY FROM A FIRST POSITION THAT PREVENTS                │
│ DISENGAGEMENT OF THE COWLING LATCH TO A SECOND POSITION THAT        │
│ ENABLES DISENGAGEMENT OF THE COWLING LATCH 908                      │
├─────────────────────────────────────────────────────────────────────┤
│ ROTATE THE LOCK ELEMENT(S) RELATIVE TO THE COWLING LATCH 910        │
└─────────────────────────────────────────────────────────────────────┘
                                    │
                                    ▼
┌─────────────────────────────────────────────────────────────────────┐
│ DISENGAGE THE COWLING LATCH 912                                     │
└─────────────────────────────────────────────────────────────────────┘
                                    │
                                    ▼
┌─────────────────────────────────────────────────────────────────────┐
│ MOVE THE FIRST COWLING PORTION AND THE SECOND COWLING PORTION       │
│ RELATIVE TO EACH OTHER TO OPEN THE AIRCRAFT ENGINE COWLING 914      │
└─────────────────────────────────────────────────────────────────────┘
```

FIG. 9

COWLING LATCH INTERLOCK MECHANISM

BACKGROUND

An engine cowling for an aircraft can include movable components, such as movable portions of a thrust reverser. The movable portions of the thrust reverser are stowed in flight and deployed upon landing to redirect thrust in a forward direction. In some examples, the movable portions of the thrust reverser are coupled to or otherwise retained by a deflection limiter band. The deflection limiter band is configured to prevent the movable portions of the thrust reverser from moving beyond a predetermined range of motion. In at least some configurations, aircraft engine cowlings feature one or more deflection limiter latches to disengage the deflection limiter band, and a cowling latch to open the aircraft engine cowling to enable access to internal components thereof. However, a technical challenge exists to prevent technicians from inadvertently damaging components of the thrust reverser, the deflection limiter band, or other engine components if the aircraft engine cowling is opened while the deflection limiter bands are engaged.

SUMMARY

According to an example, an aircraft engine cowling comprises a first cowling portion and a second cowling portion moveable relative to each other between a closed position and an open position. A cowling latch secures the first cowling portion and the second cowling portion in the closed position. The aircraft engine cowling further comprises a deflection limiter band and a deflection limiter latch moveable between an engaged state and a disengaged state for the deflection limiter band. An interlock mechanism prevents disengagement of the cowling latch while the deflection limiter latch is in the engaged state. The interlock mechanism includes a lock element moveable between a first position that prevents disengagement of the cowling latch and a second position that enables disengagement of the cowling latch. The interlock mechanism further comprises an indicator paddle moveable to contact the deflection limiter latch. A linkage assembly coordinates movement of the lock element with movement of the indicator paddle.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 9 is a flow diagram depicting an example method of opening an aircraft engine cowling.

DETAILED DESCRIPTION

As discussed above, a deflection limiter band prevents movable portions of the thrust reverser from moving beyond a predetermined range of motion. One or more deflection limiter latches can be provided to disengage the deflection limiter band. However, components of the thrust reverser, the deflection limiter band, or other engine components may be damaged if the aircraft engine cowling is opened while the deflection limiter band is engaged.

In some instances, instructional markers are provided on an exterior surface of the aircraft engine cowling to remind technicians of a proper sequence of actions to manipulate the deflection limiter latches and the cowling latch that provides access to an internal region of the aircraft engine cowling. However, this approach may not be effective in preventing damage if technicians disregard, forget, or misinterpret the instructional markers.

An interlock mechanism disclosed herein for an aircraft engine cowling that has the potential to address the above issues. The interlock mechanism comprises a lock element moveable between a first position that prevents disengagement of the cowling latch and a second position that enables disengagement of the cowling latch. The interlock mechanism further comprises an indicator paddle moveable to contact a deflection limiter latch, and a linkage assembly that coordinates movement of the lock element with movement of the indicator paddle. The lock element prevents disengagement of the cowling latch when the deflection limiter latch is engaged. This in turn prevents out-of-sequence operation of the deflection limiter latch and the cowling latch, thereby reducing or eliminating damage to the deflection limiter band or other components that may be caused by out-of-sequence operation of the latches.

Figure 1:
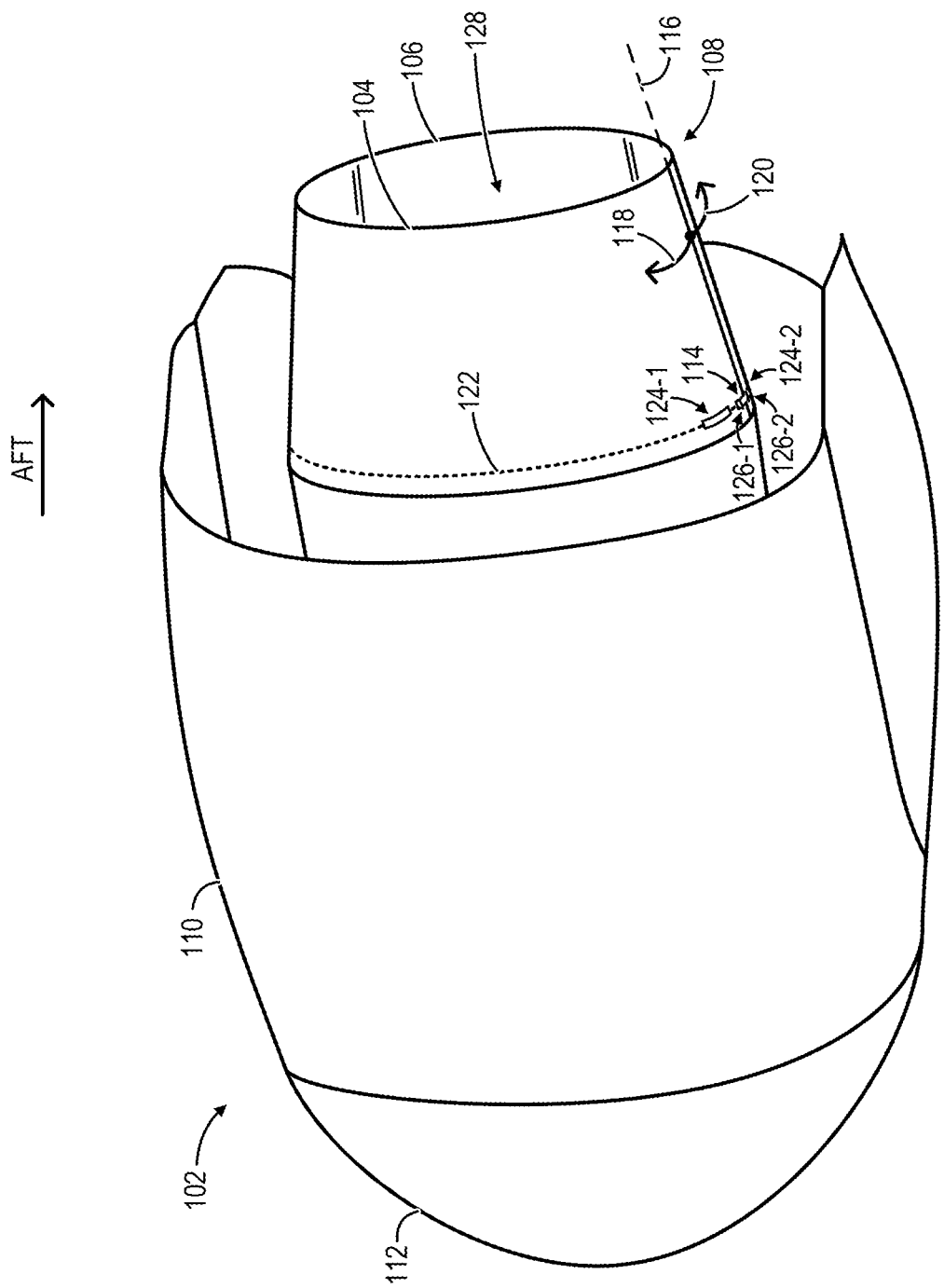
FIG. 1 depicts an example aircraft engine cowling.

FIG. 1 depicts an example of an aircraft engine cowling 102. An aft direction of aircraft engine cowling 102 is depicted in FIG. 1 for reference. Aircraft engine cowling 102 comprises a first cowling portion 104 and a second cowling portion 106. In some examples, first cowling portion 104 and second cowling portion 106 comprise a first portion and a second portion of a thrust reverser 108, respectively. In other examples, first cowling portion 104 and second cowling portion 106 comprise any other suitable portion of aircraft engine cowling 102. For example, first cowling portion 104 and second cowling portion 106 can comprise access panels in a fan cowl 110 or an inlet 112 of aircraft engine cowling 102.

First cowling portion 104 and second cowling portion 106 are moveable relative to each other between a closed position and an open position. FIG. 1 shows first cowling portion 104 and second cowling portion 106 in the closed position. First cowling portion 104 and second cowling portion 106 are secured in the closed position by a cowling latch 114, described in further detail with reference to FIG. 4. Cowling latch 114 retains in an engaged state retains first cowling portion 104 and second cowling portion 106 in the closed position. When cowling latch is disengaged, first cowling portion 104 and second cowling portion 106 can be pivoted away from each other along an interface 116 from the closed position towards the open position, as indicated schematically by arrows 118 and 120, respectively. In the open position, first cowling portion 104 and second cowling portion 106 allow access to components located within an interior region 128 of aircraft engine cowling 102.

Aircraft engine cowling 102 further comprises a deflection limiter band 122 housed within the aircraft engine cowling that limits deflection or movement of engine components to within a predefined range. In this example, deflection limiter band 122 is located within internal region 128. As described in further detail with reference to FIG. 3, deflection limiter band 122 can form an annular ring that surrounds an engine manifold located within internal region 128. An example implementation of deflection limiter band 122 is schematically depicted within FIGS. 1, 2A, and 2B by a broken or dotted line.

Deflection limiter band 122 is removably coupled to first cowling portion 104 and to second cowling portion 106 by one or more deflection limiter latches. In this example, deflection limiter band 122 is removably coupled to first cowling portion 104 by a first deflection limiter latch 124-1 and is removably coupled to second cowling portion 106 by a second deflection limiter latch 124-2 (not visible in FIG. 1). The phrase "removably coupled", as used in this context, refers to first cowling portion 104 and/or second cowling portion 106 being detachable from deflection limiter band 122.

Each deflection limiter latch is moveable between an engaged state and a disengaged state for deflection limiter band 122. In the engaged state, deflection limiter band 122 is preloaded. First cowling portion 104 can be detached from deflection limiter band 122 by moving first deflection limiter latch 124-1 from the engaged state to the disengaged state to unload a first side of the deflection limiter band. Likewise, second cowling portion 106 can be detached from deflection limiter band 122 by moving second deflection limiter latch 124-2 from the engaged state to the disengaged state to unload a second side of the deflection limiter band. In this manner, deflection limiter band 122 can be disconnected from first cowling portion 104 and from second cowling portion 106, which allows the first cowling portion and the second cowling portion to be moved (e.g., as indicated by arrows 118 and 120) without damaging the deflection limiter band or engine components located within interior region 128.

Deflection limiter band 122 can be re-coupled to first cowling portion 104 by moving deflection limiter latch 124-1 from the disengaged state to the engaged state to transition the deflection limiter band to preload the first side of the deflection limiter band. Similarly, deflection limiter band 122 can be re-coupled to second cowling portion 106 by moving deflection limiter latch 124-2 from the disengaged state to the engaged state to preload the second side of the deflection limiter band.

As described in further detail herein, aircraft engine cowling 102 comprises one or more interlock mechanisms. Each interlock mechanism comprises a lock element moveable between a first position that prevents disengagement of the cowling latch and a second position that enables disengagement of the cowling latch. In the example of FIG. 1, a lock element 124-1 of a first interlock mechanism and a lock element 124-2 of a second interlock mechanism each partially cover cowling latch 114, preventing the cowling latch from being disengaged.

Figure 2A:
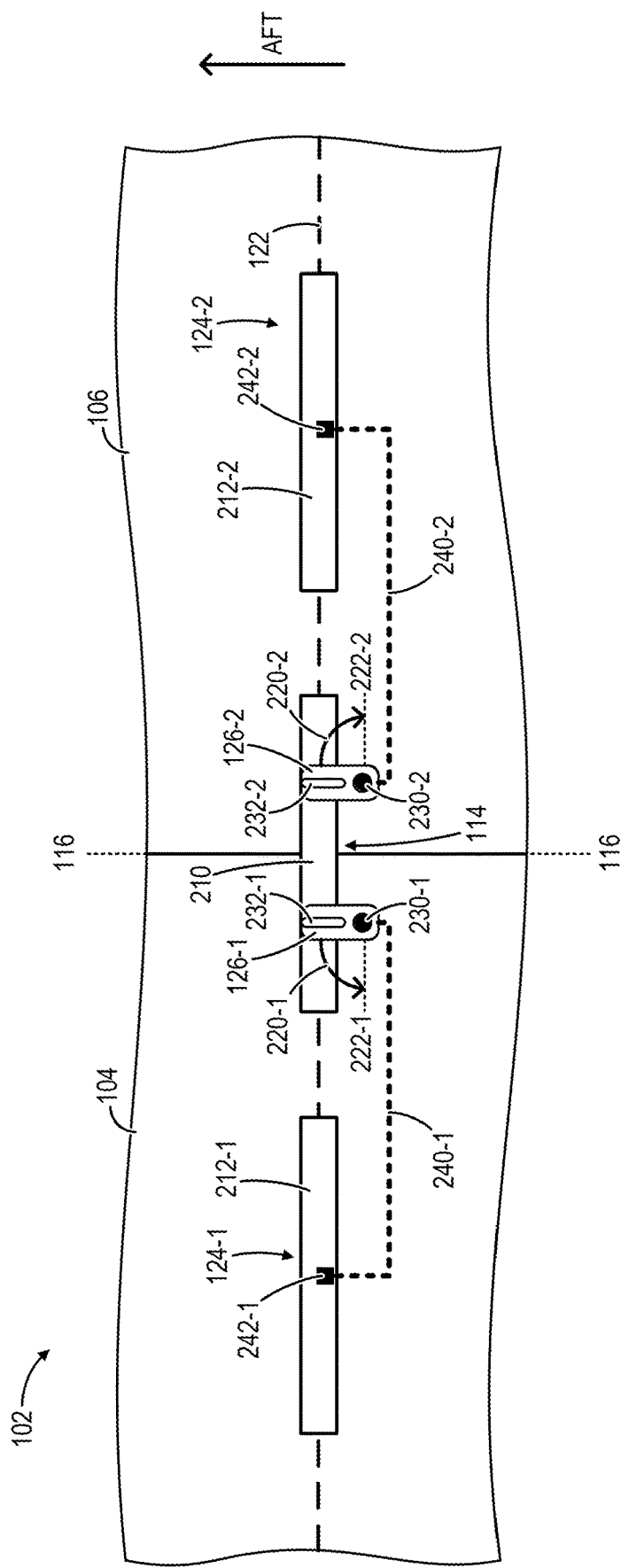
FIGS. 2A and 2B depict a bottom-up view of an exterior of the aircraft engine cowling of FIG. 1 in further detail.
Figure 2B:
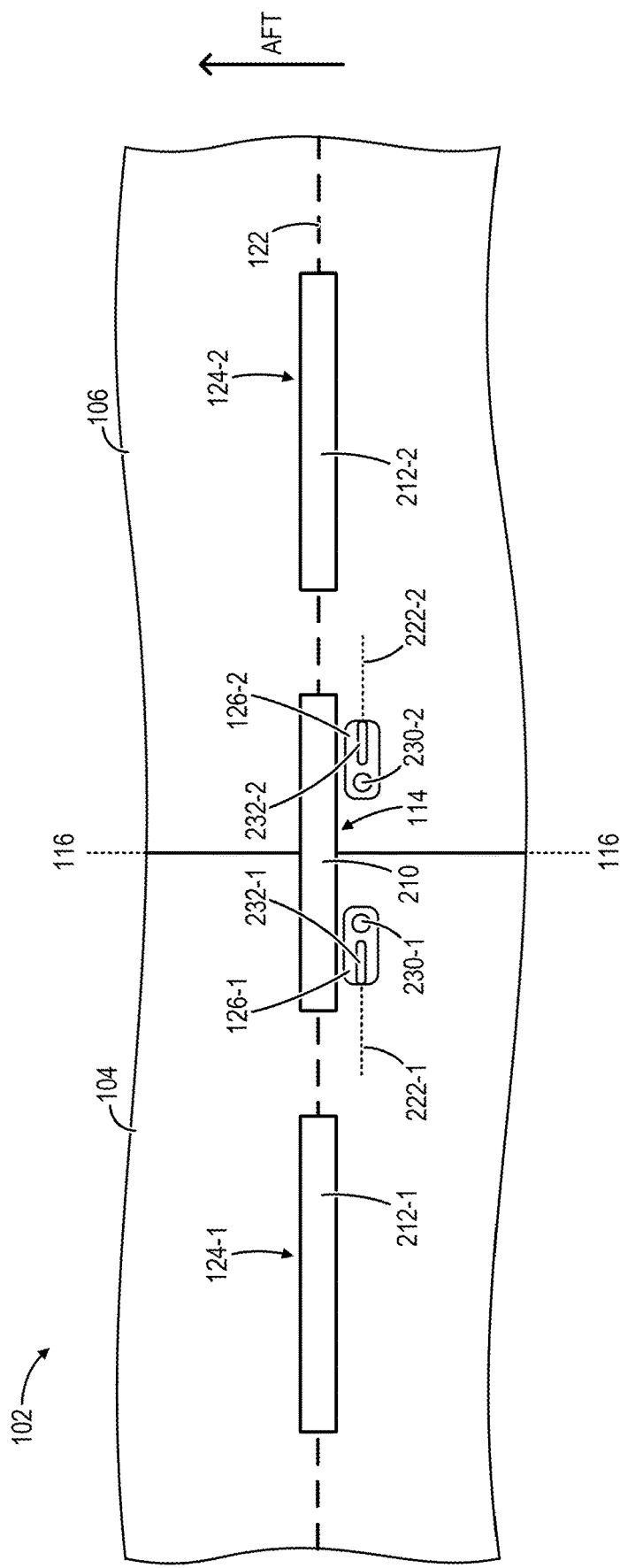

FIGS. 2A and 2B depict a bottom-up view of an exterior of first cowling portion 104 and second cowling portion 106 of aircraft engine cowling 102 in further detail. For reference, the aft direction of aircraft engine cowling 102 is depicted in FIGS. 2A and 2B in relation to FIG. 1.

FIG. 2A shows lock element 126-1 and lock element 126-2, each in a first position partially covering a handle 210 of cowling latch 114 to prevent disengagement of the cowling latch. In at least some examples, lock element 126-1 and lock element 126-2 form hand-operable levers that are rotatable relative to cowling latch 114. As an example, arrows 220-1 and 220-2 within FIG. 2A schematically depict an example of lock element 126-1 and lock element 126-2, respectively, being moved (e.g., rotated) from the first position to a second position depicted schematically at 222-1 and 222-2, respectively, to enable disengagement of cowling latch 114 by manipulation of handle 210.

FIG. 2B shows lock element 126-1 and lock element 126-2 in the second position represented at 222-1 and 222-2, respectively, in FIG. 2A. For example, in the second position schematically depicted at 222-1 and 222-2, lock element 126-1 and lock element 126-2 do not cover handle 210 or otherwise interfere with operation of cowling latch 114, enabling the cowling latch to be disengaged by manipulation of the handle.

Lock element 126-1 is rotatably mounted to aircraft engine cowling 102 via a shaft 230-1 on a first side of interface 116, enabling the lock element to be rotated between the positions depicted in FIGS. 2A and 2B. Similarly, lock element 126-2 is rotatably mounted to aircraft engine cowling 102 via a shaft 230-2 on a second side of interface 116 the opposes the first side, enabling the lock element to be rotated between the positions depicted in FIGS. 2A and 2B.

In at least some examples, lock elements 126-1 and 126-2 are mounted to shafts 230-1 and 230-2, respectively, via a removable fastener (e.g., a threaded bolt, screw, clip, or other suitable fastener) that enables the lock elements to be removed from their respective shafts. This configuration enables technicians to remove lock elements 126-1 and 126-2 to access cowling latch 114 in cases where lock elements 126-1 and 126-2 are unable to be rotated due, for example, to a mechanical issue, such as seizing of shafts 230-1 or 230-2 or other components.

In at least some examples, lock element 126-1 and lock element 126-2 each comprise a blade or fin. For example, lock element 126-1 comprises a blade or fin 232-1 that projects outward from aircraft engine cowling 102, and which enables a technician to manipulate the lock element as a hand-operable lever. Similarly, lock element 126-2 comprises a blade or fin 232-2 that projects outward from aircraft engine cowling 102, and which enables a technician to manipulate the lock element as a hand-operable lever. It will be understood that lock elements 126-1 and 126-2 can have other suitable configurations.

The first position of lock elements 126-1 and 126-2 depicted in FIG. 2A can correspond to an operational position of the lock elements during flight operations of an aircraft to which aircraft engine cowling 102 is mounted. In the example depicted in FIG. 2A, each of lock elements 126-1 and 126-2 at least partially cover handle 210 of cowling latch 114, and the blade or fin of each lock element is orientated parallel to a primary airflow vector (represented by the aft direction arrow) of aircraft engine cowling 102. Furthermore, in the example depicted in FIG. 2A, lock elements 126-1 and 126-2 extend in the aft direction from their respective shafts 230-1 and 230-2 to at least partially cover handle 210 of cowling latch 114. In this configuration, the blade or fin of each lock element can contribute to maintaining the operational position of the lock elements (e.g., as depicted in FIG. 2A) through aerodynamic interaction with air flowing along the primary airflow vector. Aerodynamic drag can be reduced by orientating the blade or fin of each lock element parallel to the primary airflow vector.

Referring again to FIG. 2A, lock element 126-1 forms part of a first interlock mechanism 240-1 (represented schematically by a dotted line in FIG. 2A), as additional components of the first interlock mechanism are located within interior region 128 on an opposite side of first cowling portion 104. First interlock mechanism 240-1 further comprises an indicator paddle 242-1, represented schematically in FIG. 2A, that is moveable to contact first deflection limiter latch 124-1. A linkage assembly of first interlock mechanism 240-1 coordinates movement of lock element 126-1 with movement of indicator paddle 242-1, as described in further detail with reference to FIG. 5.

Similarly, lock element 126-2 forms part of a second interlock mechanism 240-2 (represented schematically by a dotted line in FIG. 2A), as additional components of the second interlock mechanism are located within interior region 128 on an opposite side of second cowling portion 106. Second interlock mechanism 240-2 further comprises an indicator paddle 242-2, represented schematically in FIG. 2A, that is moveable to contact second deflection limiter latch 124-2. A linkage assembly of second interlock mechanism 240-2 coordinates movement of lock element 126-2 with movement of indicator paddle 242-2, as described in further detail with reference to FIGS. 5 and 6.

Figure 3:
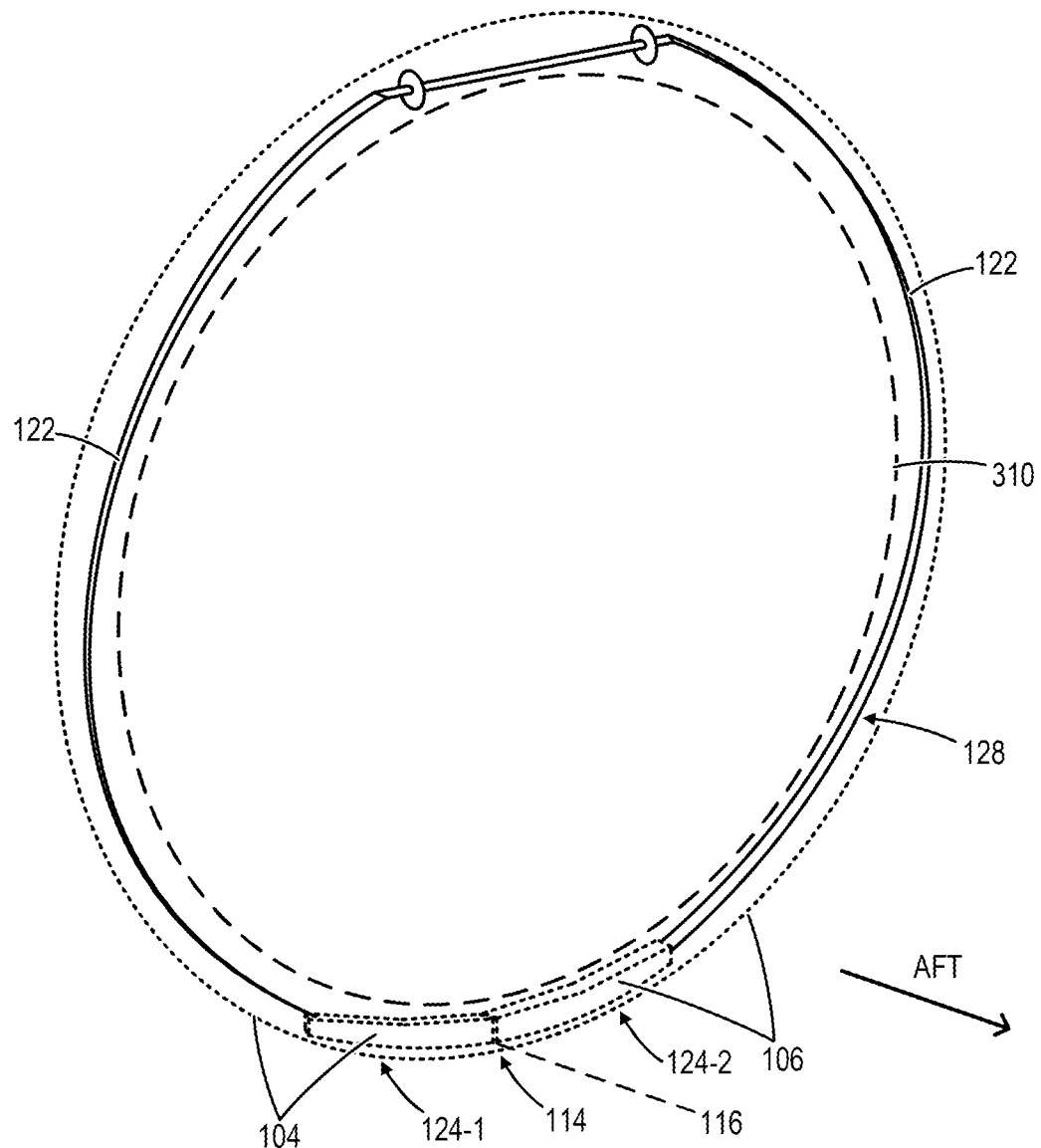
FIG. 3 depicts an example configuration of a deflection limiter band of the aircraft engine cowling of FIG. 1.

FIG. 3 depicts an example configuration of deflection limiter band 122 in further detail. Within FIG. 3, portions of first cowling portion 104 and second cowling portion 106 defining at least a portion of interior region 128 are represented schematically in the vicinity of deflection limiter band 122 by a dotted line. In this example, deflection limiter band 122 has an annular shape that surrounds an engine manifold 310, represented schematically in the vicinity of the deflection limiter band by a broken line. Within FIG. 3, the general location of cowling latch 114, first deflection limiter latch 124-1, second deflection limiter latch 124-2, and interface 116 are identified for reference.

Figure 4:
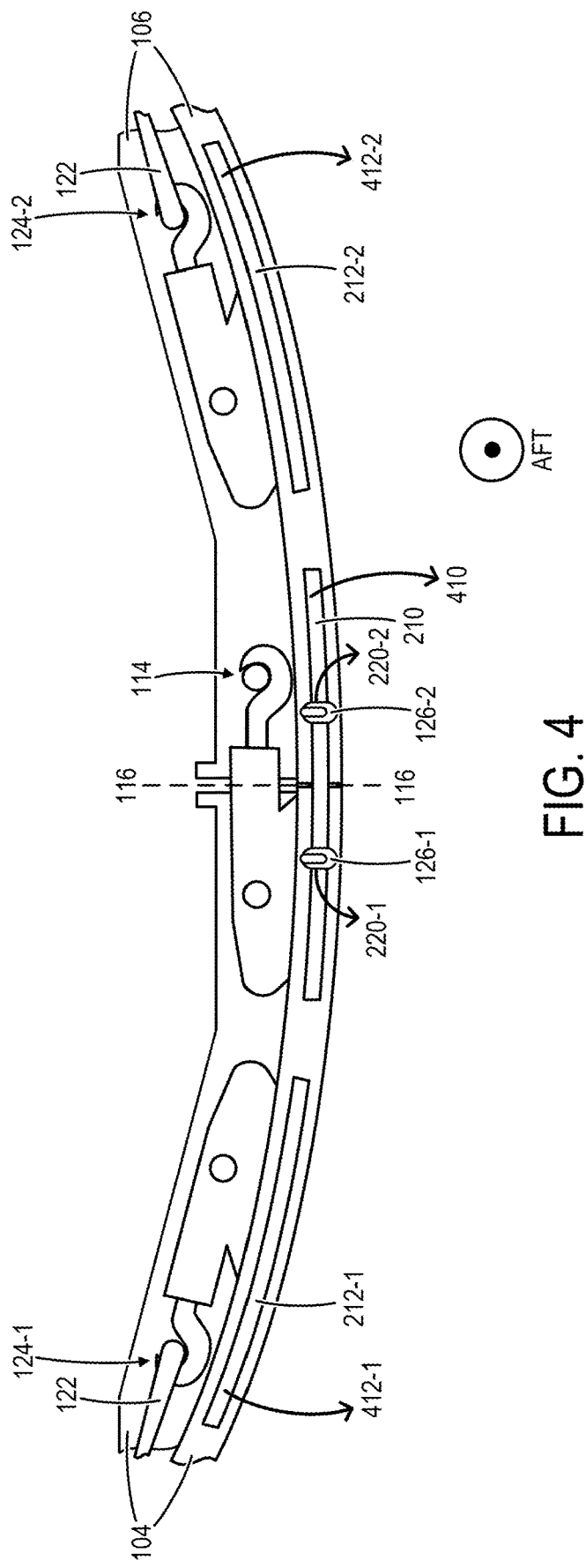
FIG. 4 depicts a portion of the aircraft engine cowling of FIG. 1 at an interface between a first cowling portion and a second cowling portion of the aircraft engine cowling.

FIG. 4 depicts a portion of aircraft engine cowling 102 in the vicinity of interface 116 between first cowling portion 104 and second cowling portion 106 in which the aft direction points out of the page.

FIG. 4 schematically depicts example operation of the latches and lock elements previously described with reference to FIGS. 1-3. As an example, handle 212-1 of first deflection limiter latch 124-1 can be rotated downward/outward from aircraft engine cowling 102 as indicated by arrow 412-1 to disengage the first deflection limiter latch, thereby disconnecting deflection limiter band 122 from first cowling portion 104. Similarly, handle 212-2 of second deflection limiter latch 124-2 can be rotated downward/outward from aircraft engine cowling 102 as indicated by arrow 412-2 to disengage the second deflection limiter latch, thereby disconnecting deflection limiter band 122 from second cowling portion 106.

Following disengagement of first deflection limiter latch 124-1 by manipulation of a handle 212-1, lock element 126-1 can be moved (e.g., rotated) as indicated by arrow 220-1 to enable handle 210 of cowling latch 114 to clear the lock element, as previously described with reference to FIGS. 2A and 2B. Similarly, following disengagement of second deflection limiter latch 124-2 by manipulation of a handle 212-2, lock element 126-2 can be moved (e.g., rotated) as indicated by arrow 220-2 to enable handle 210 of cowling latch 114 to clear the lock element, as previously described with reference to FIGS. 2A and 2B. Following lock element 126-1 and lock element 126-2 being moved to positions corresponding to disengagement of deflection limiter latches 124-1 and 124-2 (e.g., as shown in FIG. 2B), handle 210 can be rotated downward/outward as indicated by arrow 410 to disengage cowling latch 114.

Figure 5:
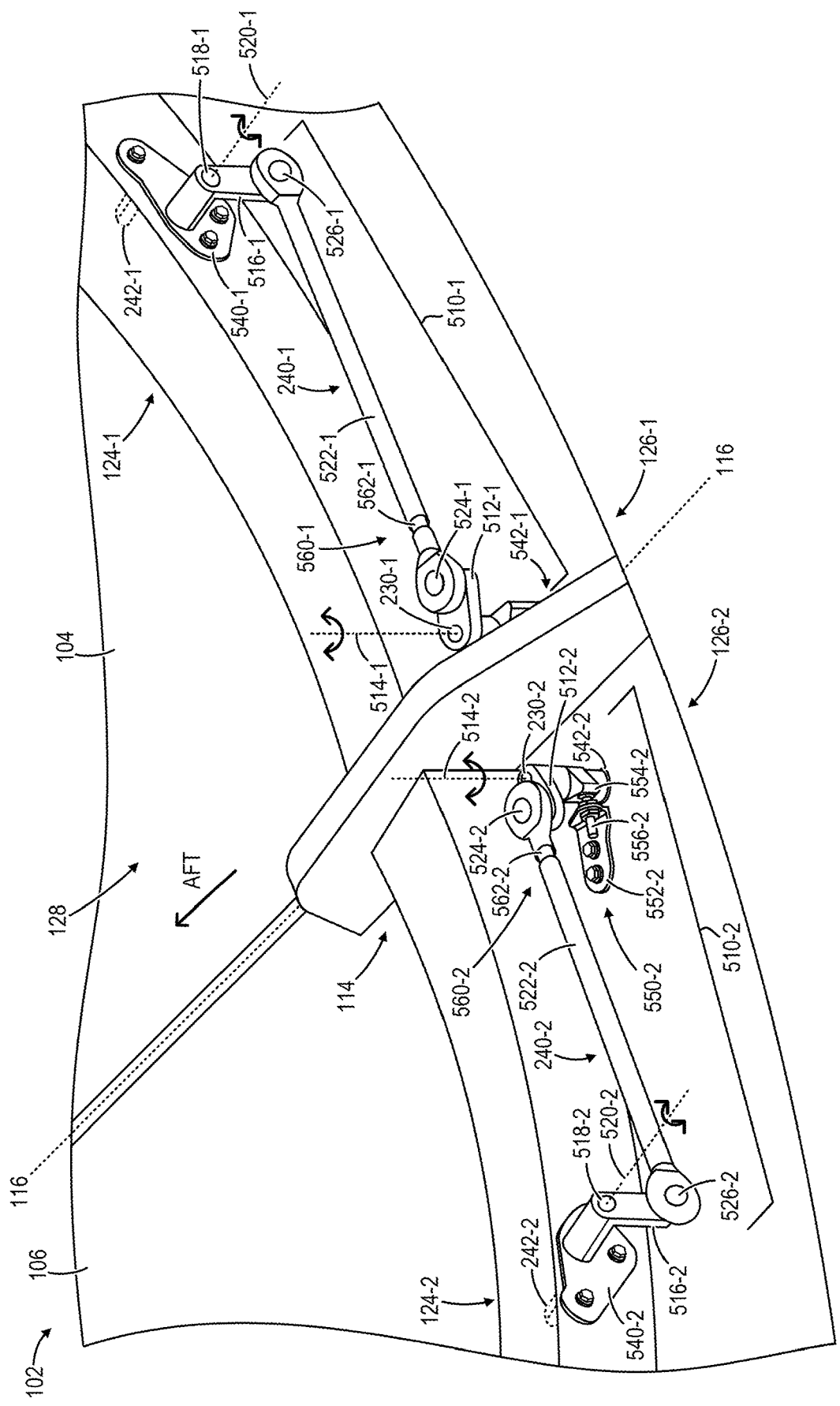
FIG. 5 depicts a portion of an interior region of the aircraft engine cowling of FIG. 1 at the interface between the first cowling portion and the second cowling portion.

FIG. 5 depicts a portion of interior region 128 of aircraft engine cowling 102 in the vicinity of interface 116 between first cowling portion 104 and second cowling portion 106. The aft direction is again depicted in FIG. 5 for reference. Within FIG. 5, additional components of first interlock mechanism 240-1 and second interlock mechanism 240-2 within interior region 128 are shown. The general locations of cowling latch 114, first deflection limiter latch 124-1, and second deflection limiter latch 124-2 are identified in FIG. 5 for reference, in relation to first interlock mechanism 240-1 and second interlock mechanism 240-2.

In this example, first deflection limiter latch 124-1 and first interlock mechanism 240-1 are located on a first side of interface 116, and can be mounted to aircraft engine cowling 102 or to first cowling portion 104 thereof. Second deflection limiter latch 124-2 and second interlock mechanism 240-2 are located on a second side of interface 116, opposite first deflection limiter latch 124-1 and first interlock mechanism 240-1. Second deflection limiter latch 124-2 and second interlock mechanism 240-2 can be mounted to aircraft engine cowling 102 or to second cowling portion 106 thereof. In this example, first interlock mechanism 240-1 and second interlock mechanism 240-2 are similarly configured, mirrored about interface 116.

Portions of indicator paddle 242-1 of first interlock mechanism 240-1 and indicator paddle 242-2 of second interlock mechanism 240-2 that are obscured from view by structural features of first cowling portion 104 and second cowling portion 106 are represented by dotted lines in FIG. 5. Indicator paddle 242-1 is moveable (e.g., rotatable) to contact first deflection limiter latch 124-1. Similarly, indicator paddle 242-2 is moveable (e.g., rotatable) to contact second deflection limiter latch 124-2, as described in further detail with reference to FIG. 6.

Each interlock mechanism further comprises a linkage assembly that coordinates movement of the lock element with movement of the indicator paddle of the interlock mechanism. For example, first interlock mechanism 240-1 comprises a linkage assembly 510-1 that coordinates movement (e.g., rotation) of lock element 126-1 (as shown in FIG. 2A) with movement (e.g., rotation) of indicator paddle 242-1. In this example, indicator paddle 242-1 is coupled to a first end of linkage assembly 510-1 and lock element 126-1 is coupled to a second end of linkage assembly 510-1. Similarly, second interlock mechanism 240-2 comprises a linkage assembly 510-2 that coordinates movement (e.g., rotation) of lock element 126-2 (as shown in FIG. 2A) with movement (e.g., rotation) of indicator paddle 242-1. In this example, indicator paddle 242-2 is coupled to a first end of linkage assembly 510-2 and lock element 126-2 is coupled to a second end of linkage assembly 510-2.

In the example depicted in FIG. 5, linkage assembly 510-1 comprises a first crank 512-1 that is mounted to shaft 230-1 upon which lock element 126-1 is mounted, thereby coordinating rotation of lock element 126-1 with rotation of first crank 512-1 about an axis of rotation 514-1. Linkage assembly 510-1 further comprises a second crank 516-1 that is mounted to a shaft 518-1 upon which indicator paddle 242-1 is also mounted, thereby coordinating rotation of indicator paddle 242-1 with rotation of second crank 516-1 about an axis of rotation 520-1.

Linkage assembly 510-1 further comprises a tie rod 522-1 that couples first crank 512-1 to second crank 516-1 of linkage assembly 510-1. In this example, tie rod 522-1 is rotatably coupled to first crank 512-1 at a first end by a pivot joint 524-1, and is rotatably coupled to second crank 516-1 at a second end by a pivot joint 526-1. This configuration enables linkage assembly 510-1 to coordinate rotation of lock element 126-1 about axis of rotation 514-1 with rotation of indicator paddle 242-1 about axis of rotation 520-1, thereby preventing out-of-sequence disengagement of cowling latch 114 while first deflection limiter latch 124-1 is engaged.

Furthermore, in this example, axis of rotation 514-1 of lock element 126-1 is angled relative to axis of rotation 520-1 of indicator paddle 242-1, thereby enabling the indicator paddle to contact first deflection limiter latch 124-1 within a suitable plane of rotation that is angled relative to a plane of rotation of the lock element. This approach can be used to support or otherwise accommodate a variety of aircraft engine cowling configurations.

Similarly, in the example depicted in FIG. 5, linkage assembly 510-2 comprises a first crank 512-2 that is mounted to shaft 230-2 upon which lock element 126-2 is mounted, thereby coordinating rotation of lock element 126-2 with rotation of first crank 512-2 about an axis of rotation 514-2. Linkage assembly 510-2 further comprises a second crank 516-2 that is mounted to a shaft 518-2 upon which indicator paddle 242-2 is also mounted, thereby coordinating rotation of indicator paddle 242-2 with rotation of second crank 516-2 about an axis of rotation 520-2.

Linkage assembly 510-2 further comprises a tie rod 522-2 that couples first crank 512-2 to second crank 516-2 of linkage assembly 510-2. In this example, tie rod 522-2 is rotatably coupled to first crank 512-2 at a first end by a pivot joint 524-2, and is rotatably coupled to second crank 516-2 at a second end by a pivot joint 526-2. This configuration enables linkage assembly 510-2 to coordinate rotation of lock element 126-2 about axis of rotation 514-2 with rotation of indicator paddle 242-2 about axis of rotation 520-2, thereby preventing out-of-sequence disengagement of cowling latch 114 while first deflection limiter latch 124-1 is engaged.

Similar to linkage assembly 510-1, axis of rotation 514-2 of lock element 126-2 is angled relative to axis of rotation 520-2 of indicator paddle 242-2, thereby enabling the indicator paddle to contact second deflection limiter latch 124-2 within a suitable plane of rotation that is angled relative to a plane of rotation of the lock element. Again, this approach can be used to support or otherwise accommodate a variety of aircraft engine cowling configurations.

It will be understood that linkage assembly 510-1 and linkage assembly 510-2 can have other suitable configurations to coordinate movement of the lock element with movement of the indicator paddle. In other examples, linkage assemblies 510-1 and 510-2 can each comprise other suitable mechanical transmission components, including rigid linkages, flexible linkages, gears, chains, etc. that prevent disengagement of cowling latch 114 prior first deflection limiter latch 124-1 and second deflection limiter latch 124-2 being disengaged.

Each interlock mechanism can be mounted to a cowling portion via one or more brackets and/or bushings. For example, second interlock mechanism 240-2 is mounted to second cowling portion 106 by a bracket 540-2 through which shaft 518-2 passes, and a bushing 542-2 through which shaft 230-2 passes. In this example, shaft 230-2 of second interlock mechanism 240-2, upon which lock element 126-2 is mounted as shown in FIG. 2A, passes through bushing 542-2 and an opening formed in second cowling portion 106. Similarly, first interlock mechanism 240-1 can be mounted to first cowling portion 104 by a bracket 540-1 through which shaft 518-1 passes, and a bushing 542-1 (not visible in FIG. 5) through which shaft 230-1 passes. In this example, shaft 230-1 of first interlock mechanism 240-1, upon which lock element 126-1 is mounted as shown in FIG. 2A, passes through bushing 542-1 and an opening formed in first cowling portion 104.

In at least some examples, each interlock mechanism comprises one or more adjustment mechanisms that enable aspects of the interlock mechanism to be adjusted. In this example, first interlock mechanism 240-1 comprises adjustment mechanisms 550-1 and 560-1, and second interlock mechanism 240-2 comprises adjustment mechanisms 550-2 and 560-2

Referring to second interlock mechanism 240-2, adjustment mechanism 550-2 enables adjustment of a stop position (e.g., the first position depicted in FIG. 2A) of lock element 126-2 in a first direction of rotation (e.g., opposite the direction of arrow 220-2) about axis of rotation 514-2. In this example, adjustment mechanism 550-2 includes an adjustment bracket 552-2 and a stop crank 554-2 that is mounted upon shaft 230-2. Adjustment bracket 552-2 includes an adjustable stop 556-2 that contacts a nose portion of crank 554-2 to inhibit rotation of crank 554-2 about axis 514-2 beyond a desired stop angle. The stop angle can correspond to the operational position of the lock element during flight operations of the aircraft, such as parallel to a primary airflow vector or other suitable angular position.

As described in further detail with reference to FIG. 6, adjustable stop 556-2 can take the form of a threaded shaft that can be extended or retracted relative to crank 554-2 to vary the stop angle. As lock element 126-2 and crank 512-2 are also mounted upon shaft 230-2, the stop angle also defines a maximum angular position of crank 512-2 and a maximum angular position of lock element 126-2 in a direction of rotation corresponding to lock element covering handle 210 of cowling latch 114, such as shown in FIG. 2A. As lock element 126-2 is rotated from the maximum angular position defined by the stop angle toward a position that does not cover handle 210 of cowling latch 114, the nose portion of crank 554-2 rotates away from adjustable stop 556-2, as will be described in further detail with reference to FIG. 6.

Adjustment mechanism 550-1 of first interlock mechanism 240-1 similarly enables adjustment of a stop position (e.g., the first position depicted in FIG. 2A) of first lock element 126-1 in a first direction of rotation (e.g., opposite the direction of arrow 220-1) about axis of rotation 514-1. Adjustment mechanism 550-1 includes a similar configuration as adjustment mechanism 550-2, mirrored about interface 116.

Referring to second interlock mechanism 240-2, adjustment mechanism 560-2 enables adjustment of an angular relationship between lock element 126-2 and indicator paddle 242-2 by adjusting a length of tie rod 522-2. As an example, second interlock mechanism 240-2 includes a threaded shaft 562-2 of tie rod 522-2 that enables a length of tie rod 522-2 between pivot joints 524-2 and 526-2 to be adjusted, thereby adjusting an angular relationship between lock element 126-2 and indicator paddle 242-2. For example, the angular relationship between lock element 126-2 and indicator paddle 242-2 can be adjusted so that lock element 126-2 at least partially covers handle 210 of cowling latch 114 so long as second deflection limiter latch 124-2 remains in the engaged state.

Additionally, the angular relationship between lock element 126-2 and indicator paddle 242-2 can be adjusted so that indicator paddle 242-2 contacts second deflection limiter latch 124-2 with a desired force (i.e., preloading) when the second deflection limiter latch is fully engaged and lock element 126-2 is rotated to a desired operational position covering handle 210 of cowling latch 114. As an example, the force by which the indicator paddle contacts the deflection limiter latch can be adjusted to preload second interlock mechanism 240-2, thereby reducing or eliminating lash and other dynamic effects across components of the interlock mechanism that may otherwise enable out-of-sequence operation of cowling latch 114 and second deflection limiter latch 124-2.

Adjustment mechanism 560-1 of first interlock mechanism 240-1 similarly enables adjustment of an angular relationship between lock element 126-1 and indicator paddle 242-1 by adjusting a length of tie rod 522-1. Adjustment mechanism 560-1 includes a similar configuration as adjustment mechanism 560-2, mirrored about interface 116.

Figure 6:
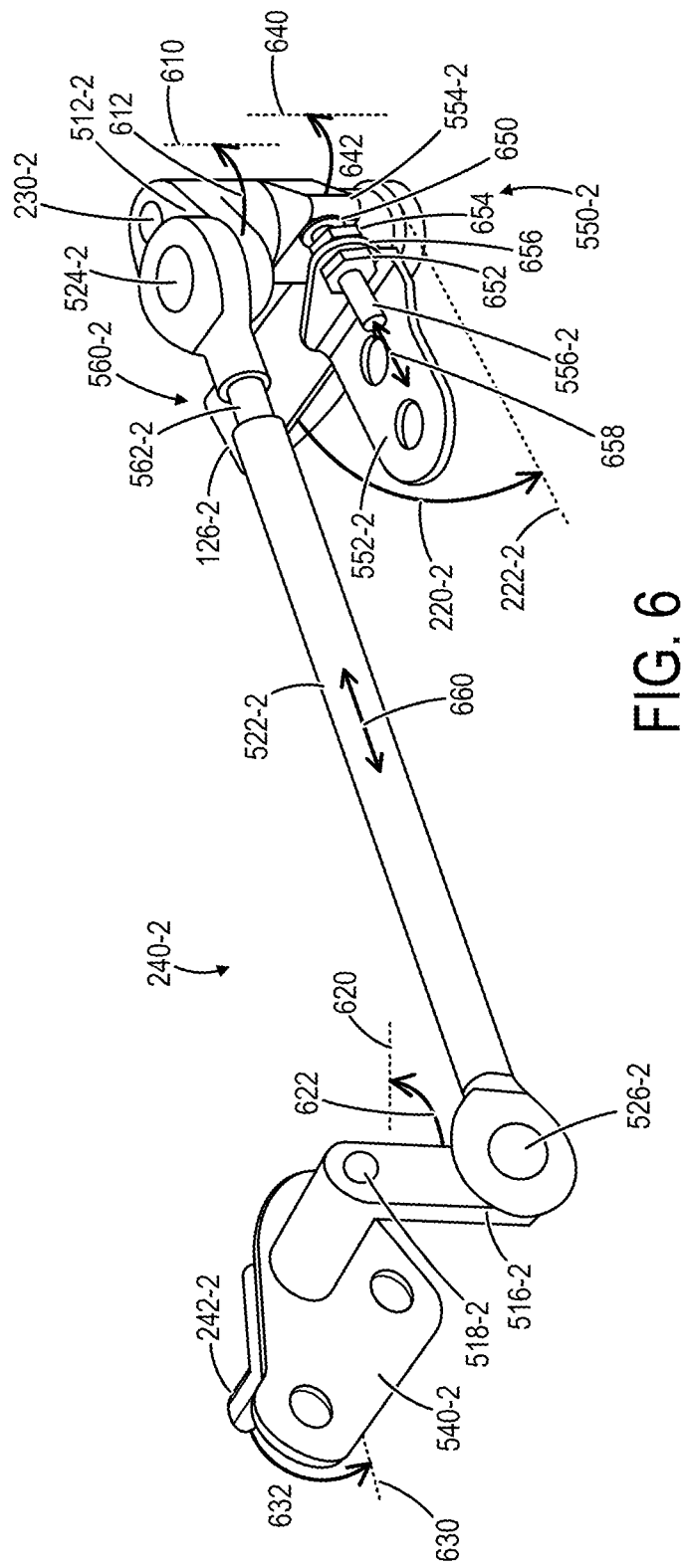
FIG. 6 schematically depicts an example operation of an interlock mechanism depicted in FIG. 5.

FIG. 6 schematically depicts an example operation of second interlock mechanism 240-2. As previously described, first interlock mechanism 240-1 has a similar configuration as second interlock mechanism 240-2 and can operate similarly to second interlock mechanism 240-2, mirrored about interface 116.

In the example of FIG. 6, lock element 126-2 is rotated from the first position depicted in FIG. 2A to second position 222-2, as indicated by arrow 220-2. As first crank 512-2 is mounted upon shaft 230-2 to which lock element 126-2 is also mounted, rotation of lock element 126-2 induces rotation of first crank 512-2 from a first position depicted in FIG. 6 to a second position depicted schematically at 610, as indicated by arrow 612. As tie rod 522-2 couples first crank 512-2 to second crank 516-2, rotation of first crank 512-2 induces rotation of second crank 516-2 from a first position depicted in FIG. 6 to a second position depicted schematically at 620, as indicated by arrow 622. As second crank 516-2 is mounted upon shaft 526-2 to which indicator paddle 242-2 is also mounted, rotation of second crank 516-2 induces rotation of indicator paddle 242-2 from a first position depicted in FIG. 6 to a second position depicted schematically at 630, as indicated by arrow 632.

FIG. 6 further depicts additional aspects of adjustment mechanism 550-2. As stop crank 554-2 is also mounted upon shaft 230-2 to which lock element 126-2 is also mounted, rotation of lock element 126-2 induces rotation of stop crank 554-2 from a first position depicted in FIG. 6 that is in contact with a distal end 650 of adjustable stop 556-2 to a second position depicted schematically at 640, as indicated by arrow 642. In this example, adjustable stop 556-2 takes the form of a threaded shaft that passes through a mount portion 656 of adjustment bracket 552-2. Adjustable stop 556-2 can be retained at a fixed position relative to adjustment bracket 552-2 by threaded nuts 652 and 654 located on opposing sides of mount portion 656. As indicated schematically by arrow 658, a projection of adjustable stop 556-2 from mount portion 656 can be adjusted by loosening nuts 652 and 654 to enable translation of adjustable stop 556-2 relative to mount portion 656. Nuts 652 and 654 can be retightened on opposing sides of mount portion 656 to retain adjustable stop 556-2 as a desired fixed position.

FIG. 6 further depicts additional aspects of adjustment mechanism 560-2. Threaded shaft 562-2 can be rotated to increase or decrease a length of tie rod 522-2 between pivot joints 524-2 and 526-2, as indicated by arrow 660.

The adjustment mechanisms disclosed herein can be used to achieve a desired loading (i.e., preloading) of the indicator paddle on the deflection limiter latch for each interlock mechanism. As an example, adjustment mechanisms 550-2 and 560-2 of second interlock mechanism 240-2 can be used individually or in combination to achieve a desired preloading of indicator paddle 242-2 on second deflection limiter latch 124-2 when the second deflection limiter latch is fully engaged and lock element 126-2 is rotated to its maximum angular position as defined by the stop angle of adjustment mechanism 550-2.

As a first example, an adjustable stop 556-2 of adjustment mechanism 550-2 can be adjusted to contact stop crank 554-2 at an angular position of shaft 230-2 that corresponds to indicator paddle 242-2 applying a desired preloading on second deflection limiter latch 124-2. As a second example, a length of tie rod 522-2 can be adjusted via adjustment mechanism 560-2 to achieve a desired preloading of indicator paddle 242-2 on second deflection limiter latch 124-2 for a given angular position of shaft 230-2, such as an angular position that corresponds to a desired angular position of lock element 126-2 during flight operations of the aircraft. In this example, a length of tie rod 522-2 can be decreased to increase preloading or increased to reduce preloading. As a third example, adjustable stop 556-2 can be adjusted to decrease a distance that distal end 650 extends beyond mount portion 656; a length of tie rod 522-2 can then be shortened to remove slack from interlock mechanism 240-2 until indicator paddle 242-2 makes contact with second deflection limiter latch 124-2; and adjustable stop 556-2 can then be adjusted to increase the distance that distal end 650 extends beyond mount portion 656 to increase preloading of the indicator paddle on the second deflection limiter latch to a desired level. Adjustments to second interlock mechanism 240-2 can be performed during installation and periodically over time as a maintenance task using adjustment mechanisms 550-2 and/or 560-2. It will be understood that adjustment of first interlock mechanism 240-1 can be similarly performed to achieved a desired preloading of indicator paddle 242-1 on first deflection limiter latch 124-1.

Figure 7A:
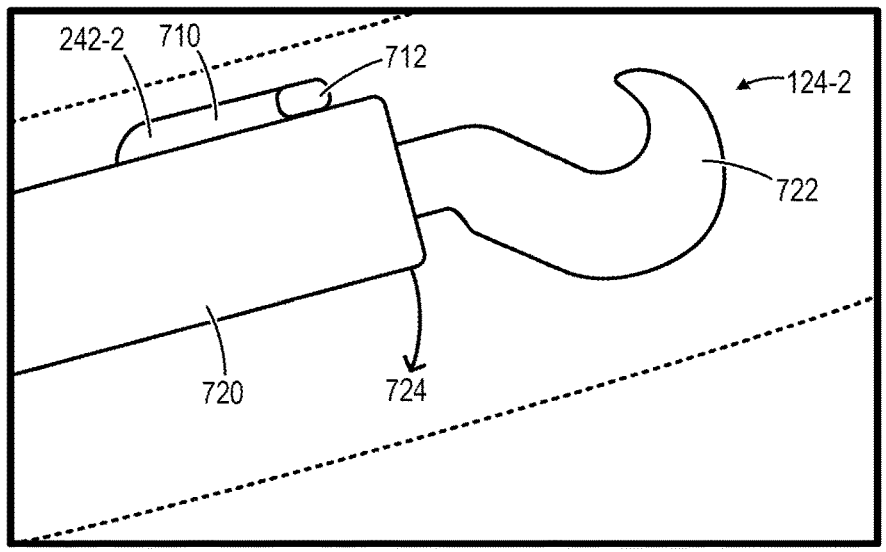
FIGS. 7A, 7B, and 7C schematically depict an example sequence of operations involving a deflection limiter latch and the interlock mechanism of FIG. 6 as part of enabling disengagement of a cowling latch.
Figure 7B:
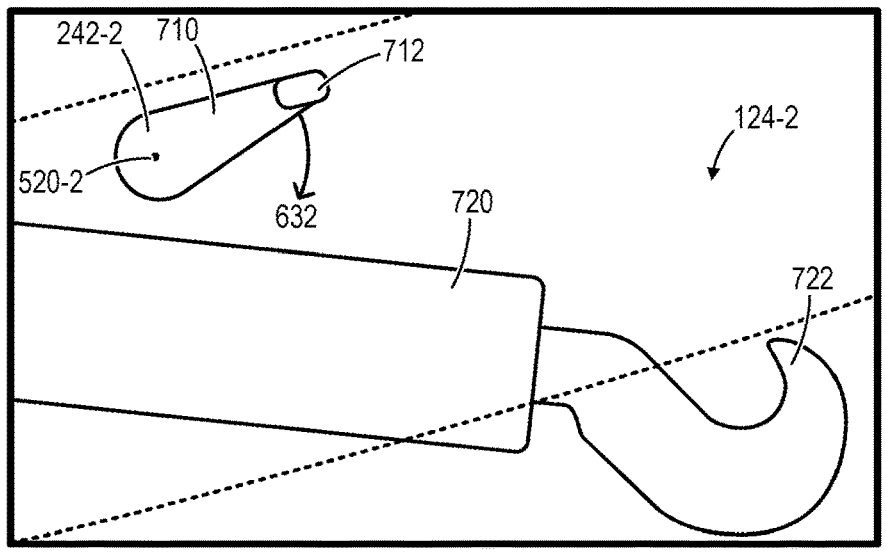
Figure 7C:
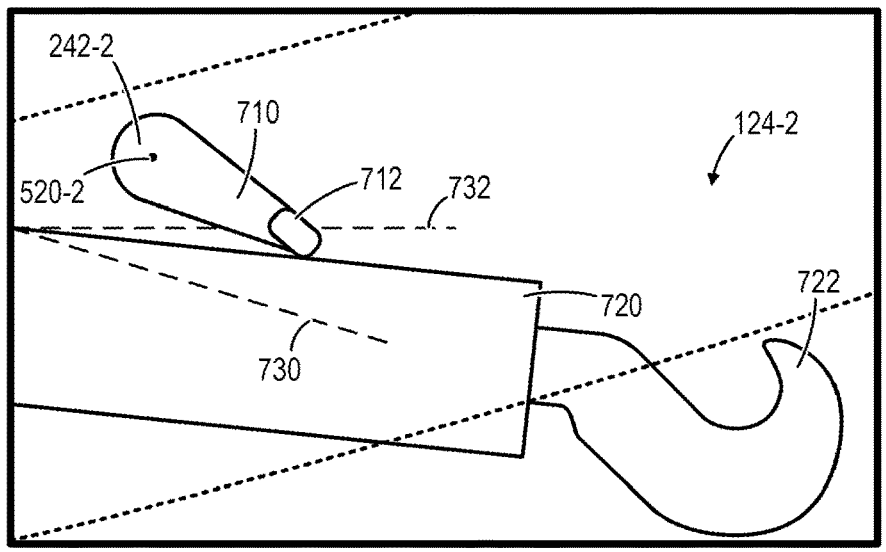

FIGS. 7A, 7B, and 7C schematically depict an example sequence of operations involving second deflection limiter latch 124-2 and indicator paddle 242-2 of second interlock mechanism 240-2 as part of enabling disengagement of cowling latch 114. It will be understood that a similar sequence of operations as those shown in FIGS. 7A, 7B, and 7C involving first deflection limiter latch 124-1 and indicator paddle 242-1 of first interlock mechanism 240-1 can be performed as part of enabling disengagement of cowling latch 114. Within FIGS. 7A, 7B, and 7C features of aircraft engine cowling, including second cowling portion 106 are represented by dotted lines for purposes of clarity.

In the example of FIGS. 7A, 7B, and 7C, indicator paddle 242-2 comprises a paddle arm 710 and a paddle head 712 disposed at a distal end of the paddle arm from axis of rotation 520-2, depicted in FIG. 5. Additionally, in this example, second deflection limiter latch 124-2 comprises a latch arm 720 and a latch head 722 (e.g., a hook) that can engage with deflection limiter band 122, as depicted in FIG. 4.

Within FIG. 7A, second deflection limiter latch 124-2 is located at a position corresponding to the engaged state with respect to deflection limiter band 122 (not shown). Paddle head 712 of indicator paddle 242-2 within FIG. 7A is in contact with latch arm 720 of second deflection limiter latch 124-2 in the engaged state, which corresponds to a position of lock element 126-2 at least partially covering handle 210 of cowling latch 114, such as depicted in FIG. 2A. As indicator paddle 242-2 is in contact with second deflection limiter latch 124-2 in the engaged state in FIG. 7A, lock element 126-2 cannot be moved to a position that is clear of handle 210 of cowling latch 114, thereby preventing disengagement of the cowling latch. Within the example of FIG. 7A, indicator paddle 242-2 contacts second deflection limiter latch 124-2 with a force that corresponds to preloading of the indicator paddle when lock element 126-2 is rotated to its maximum angular position defined by adjustable stop 556-2, corresponding to the operational position of the lock element during flight of the aircraft. Additionally, within FIG. 7A, a direction of motion of latch arm 720 and latch head 722 is depicted schematically by arrow 724 from the engaged state to the disengaged state shown in FIG. 7B.

Within FIG. 7B, second deflection limiter latch 124-2 is located at a position corresponding to the disengaged state with respect to deflection limiter band 122 (not shown) due to motion of latch arm 720 and latch head 722 from the engaged state of FIG. 7A. In the example of FIG. 7B, paddle head 712 of indicator paddle 242-2 is no longer in contact with latch arm 720 of second deflection limiter latch 124-2, which enables the indicator paddle to be rotated about axis of rotation 520-2 (orientated into and out of the page) as indicated by arrow 632, as previously described with reference to FIG. 6.

Within FIG. 7C, indicator paddle 242-2 is rotated about axis of rotation 520-2 as indicated by arrow 632 of FIG. 7B due to rotation of lock element 126-1 from the first position shown in FIG. 2A to the second position shown in FIG. 2B, as an example. In this example, paddle head 712 of indicator paddle 242-2 is rotated toward and into contact with latch arm 720 of second deflection limiter latch 124-2 while the second deflection limiter latch is in a position corresponding to the disengaged state.

It will be understood that, in some scenarios, rotation of indicator paddle 242-2 to a position at which lock element 126-1 clears handle 210 of cowling latch 114 sufficient to enable disengagement of the cowling latch may not involve indicator paddle 242-2 contacting second deflection limiter latch 124-2 while in a disengaged state. For example, second deflection limiter latch 124-2 may be moved a sufficient distance (e.g., to a position represented by broken line 730) beyond a transition from the engaged state to the disengaged state to avoid contact with indicator paddle 242-2 even after lock element 126-1 is moved to a position that enables disengagement of cowling latch 114. In other scenarios, it will be understood that if second deflection limiter latch 124-2 was not fully disengaged (e.g., at a position represented by broken line 732), rotation of paddle head 712 into contact with latch arm 720 corresponds to a position of lock element 126-1 partially covering handle 210 of cowling latch 114, thereby preventing disengaged of the cowling latch.

In at least some examples, the transition from the engaged state to the disengaged state of the deflection limiter latch corresponds to a clearance distance between the lock element and the handle of the cowling latch. As a first example, each lock element clears the cowling latch 114 by a clearance distance of greater than zero but less than 0.5 inches at the transition from the engaged state to the disengaged state of the deflection limiter latch. In other examples, this clearance distance can be greater than zero, but less than 0.25-0.3 inches or greater than 0.5 inches. It will be understood that any suitable clearance distance can be defined by adjustment of the interlock mechanisms through use of the adjustment mechanisms disclosed herein.

Figure 8:
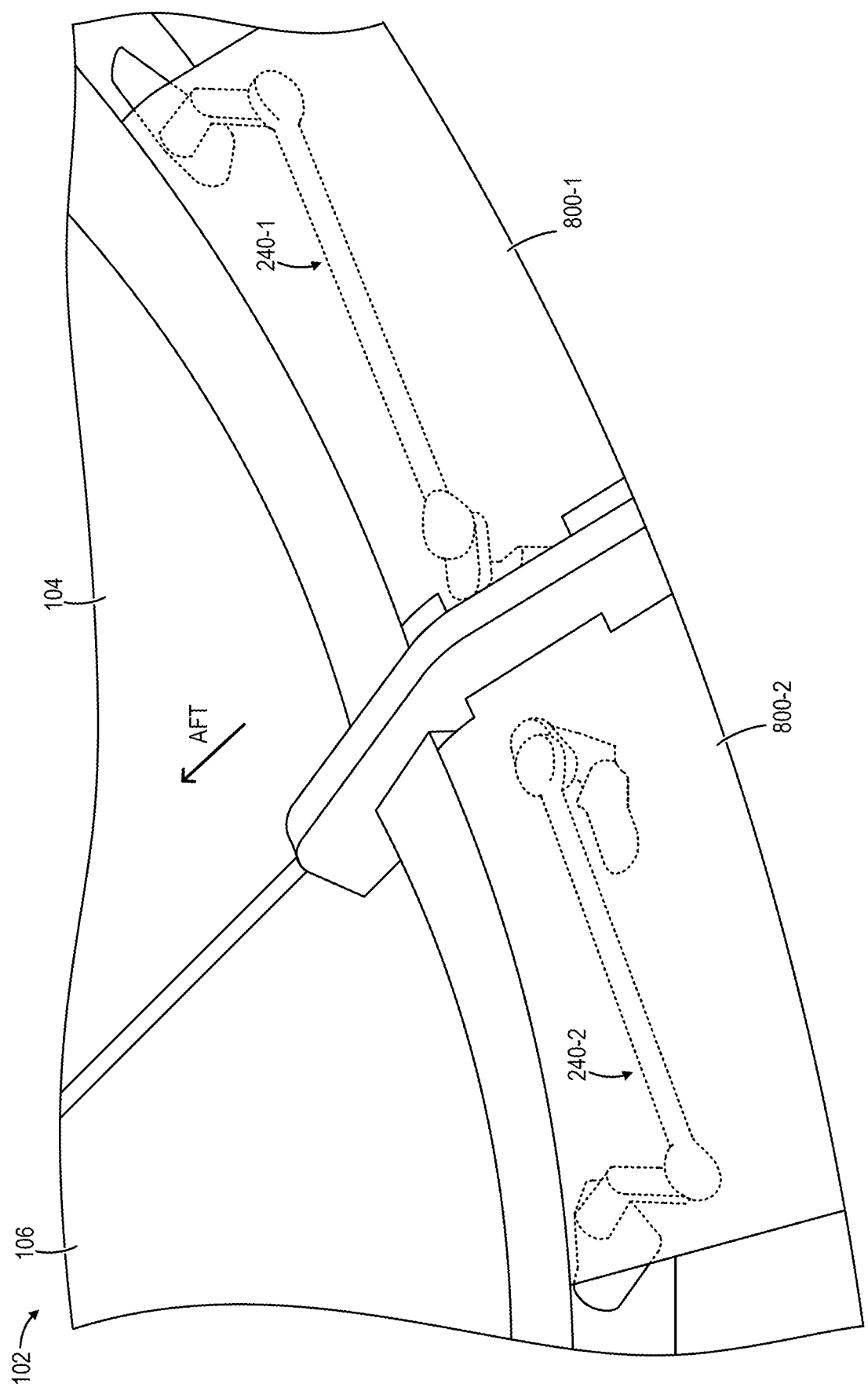
FIG. 8 depicts an example protective cover for interlock mechanisms of FIG. 5.

With reference now to FIG. 8, in at least some examples, a protective cover is provided over the interlock mechanisms. For example, within FIG. 8, aircraft engine cowling 102 further includes a first cover bracket 800-1 that covers some or all of first interlock mechanism 240-1 and a second cover bracket 800-2 covers some or all of second interlock mechanism 240-2. First cover bracket 800-1 and second cover bracket 800-2 can be included to prevent a blanket or other components within aircraft engine cowling 102 from contacting and/or impeding movement of the components of interlock mechanisms 240-1 and 240-2.

FIG. 9 is a flow diagram depicting an example method 900 of opening an aircraft engine cowling, such as example aircraft engine cowling 102. While method 900 is described with reference to the components of aircraft engine cowling 102, it will be understood that method 900 can be performed in other contexts using other suitable components or configurations. Furthermore, it will be understood that method 900 is provided by way of example, and that various steps of method 900 can be, at times, omitted or performed in a different order than described, and can include additional and/or alternative steps without departing from the scope of this disclosure.

At 902, the method 900 comprises disengaging at least one deflection limiter latch for a deflection limiter band housed within the aircraft engine cowling to move the deflection limiter latch away from contact with an indicator paddle of an interlock mechanism. For example, second deflection limiter latch 124-2 is disengaged from the deflection limiter band in the example of FIG. 7B. Accordingly, second deflection limiter latch 124-2 does not contact indicator paddle 242-2 when lock element 126-2 covers a portion of handle 210 cowling latch 114. This allows a user to rotate lock element 126-2 when the deflection limiter latch 124-2 is disengaged.

In at least some examples, at 904, the method 900 further comprises disengaging a second deflection limiter latch for the deflection limiter band to move the second deflection limiter latch away from contact with an indicator paddle of a second interlock mechanism. For example, a user can disengage both first deflection limiter latch 124-1 and second deflection limiter latch 124-2 to provide freedom of motion for both indicator paddle 242-1 and indicator paddle 242-2. Accordingly, first interlock mechanism 240-1 and second interlock mechanism 240-2 enable lock element 126-1 and lock element 126-2 to be moved to a position that enables disengagement of cowling latch 114.

At 906, the method 900 comprises moving a lock element of the interlock mechanism that at least partially covers a cowling latch and that is coupled to the indicator paddle via a linkage assembly from a first position that prevents disengagement of the cowling latch to a second position that enables disengagement of the cowling latch. In this example, the cowling latch secures a first cowling portion and a second cowling portion in a closed position, as previously described. For example, lock element 126-1 can be moved from the first position depicted in FIG. 2A to the second position depicted in FIG. 2B.

In some examples, at 908, the method 900 further comprises moving a lock element of the second interlock mechanism that at least partially covers the cowling latch and that is coupled to the indicator paddle of the second interlock mechanism via a linkage assembly from a first position that prevents disengagement of the cowling latch to a second position that enables disengagement of the cowling latch. For example, lock element 126-2 can be moved from the first position depicted in FIG. 2A to the second position depicted in FIG. 2B.

In this manner, lock element 126-1 and lock element 126-2 ensure proper sequencing between first deflection limiter latch 124-1, second deflection limiter latch 124-2, and cowling latch 114.

At 910, in at least some examples, moving each lock element comprises rotating the lock element relative to the cowling latch. For example, in FIG. 2A, lock element 126-1 is rotated relative to cowling latch 114 about shaft 230-1 as indicated by arrow 220-1, and lock element 126-2 is rotated relative to cowling latch 114 about shaft 230-2. By moving each lock element out of the way of cowling latch 114, a user (e.g., an aircraft technician) can disengage the cowling latch.

The method 900 further comprises, at 912, disengaging the cowling latch. As an example, handle 210 can be operated to disengage cowling latch 114.

At 914, the method 900 comprises moving the first cowling portion and the second cowling portion relative to each other to open the aircraft engine cowling. For example, disengagement of the cowling latch 114 of FIG. 1 enables separation of first cowling portion 104 and second cowling portion 106 as indicated by arrows 118 and 120 of FIG. 1. This allows access to one or more internal components within the aircraft engine cowling while preventing damage to the aircraft engine cowling and aircraft components contained therein that may otherwise result from out-of-sequence operation of cowling latch 114, first deflection limiter latch 124-1, and second deflection limiter latch 124-2.

Further, the disclosure comprises configurations according to the following clauses.

Clause 1. An aircraft engine cowling, comprising: a first cowling portion and a second cowling portion moveable relative to each other between a closed position and an open position; a cowling latch that secures the first cowling portion and the second cowling portion in the closed position; a deflection limiter band; a deflection limiter latch moveable between an engaged state and a disengaged state for the deflection limiter band; an interlock mechanism that prevents disengagement of the cowling latch while the deflection limiter latch is in the engaged state, the interlock mechanism including: a lock element moveable between a first position that prevents disengagement of the cowling latch and a second position that enables disengagement of the cowling latch, an indicator paddle moveable to contact the deflection limiter latch, and a linkage assembly that coordinates movement of the lock element with movement of the indicator paddle.

Clause 2. The aircraft engine cowling of clause 1, wherein the interlock mechanism is a first interlock mechanism; wherein the deflection limiter latch is a first deflection limiter latch for the deflection limiter band; and wherein the aircraft engine cowling further comprises: a second deflection limiter latch that is moveable between an engaged state and a disengaged state for the deflection limiter band; and a second interlock mechanism that prevents disengagement of the cowling latch while the second deflection limiter latch is in the engaged state, the second interlock mechanism including: a lock element moveable between a first position that prevents disengagement of the cowling latch and a second position that enables disengagement of the cowling latch, an indicator paddle moveable to contact the second deflection limiter latch, and a linkage assembly that coordinates movement of the lock element of the second interlock mechanism with movement of the indicator paddle of the second interlock mechanism.

Clause 3. The aircraft engine cowling of clause 2, the first deflection limiter latch and the first interlock mechanism are located on a first side of an interface between the first cowling portion and the second cowling portion; and wherein the second deflection limiter latch and the second interlock mechanism are located on a second side of the interface between the first cowling portion and the second cowling portion.

Clause 4. The aircraft engine cowling of clause 1, wherein the indicator paddle forms a crank coupled to a first end of the linkage assembly; and wherein the lock element forms a hand-operable lever coupled to a second end of the linkage assembly.

Clause 5. The aircraft engine cowling of clause 1, wherein the lock element comprises a blade or fin.

Clause 6. The aircraft engine cowling of clause 1, wherein the lock element covers at least a portion of a handle of the cowling latch in the first position; and wherein the lock element does not cover the handle of the cowling latch in the second position.

Clause 7. The aircraft engine cowling of clause 1, wherein the lock element is rotatable relative to the cowling latch.

Clause 8. The aircraft engine cowling of clause 1, wherein the linkage assembly includes: a first crank rotatable about an axis of rotation of the lock element; a second crank rotatable about an axis of rotation of the indicator paddle; and a tie rod coupling a crank arm of the first crank to a crank arm of the second crank.

Clause 9. The aircraft engine cowling of clause 8, wherein the linkage assembly converts rotation of the lock element about an axis of rotation to rotation of the indicator paddle about an axis of rotation that is angled relative to the axis of rotation of the lock element.

Clause 10. The aircraft engine cowling of clause 8, wherein the interlock mechanism is mounted within the aircraft engine cowling by an adjustable bracket that enables adjustment of an angular relationship between the lock element and the indicator paddle.

Clause 11. An interlock mechanism for an aircraft engine cowling having a first cowling portion and a second cowling portion moveable relative to each other between a closed position and an open position, the interlock mechanism comprising: a lock element moveable between a first position that prevents disengagement of a cowling latch that secures the first cowling portion to the second cowling portion in the closed position, and a second position that enables disengagement of the cowling latch; an indicator paddle moveable to contact a deflection limiter latch moveable between an engaged state and a disengaged state for a deflection limiter band of the aircraft engine cowling, and a linkage assembly that coordinates movement of the lock element with movement of the indicator paddle.

Clause 12. The interlock mechanism of clause 11, wherein the indicator paddle forms a crank coupled to a first end of the linkage assembly; and wherein the lock element forms a hand-operable lever coupled to a second end of the linkage assembly.

Clause 13. The interlock mechanism of clause 11, wherein the lock element comprises a blade or fin.

Clause 14. The interlock mechanism of clause 11, wherein the lock element covers at least a portion of a handle of the cowling latch in the first position; and wherein the lock element does not cover the handle of the cowling latch in the second position.

Clause 15. The interlock mechanism of clause 11, wherein the lock element is rotatable relative to the cowling latch.

Clause 16. The interlock mechanism of clause 11, wherein the linkage assembly includes: a first crank rotatable about an axis of rotation of the lock element; a second crank rotatable about an axis of rotation of the indicator paddle; and a tie rod coupling a crank arm of the first crank to a crank arm of the second crank.

Clause 17. The interlock mechanism of clause 16, wherein the linkage assembly converts rotation of the lock element about an axis of rotation to rotation of the indicator paddle about an axis of rotation that is angled relative to the axis of rotation of the lock element.

Clause 18. A method of opening an aircraft engine cowling, the method comprising: disengaging at least one deflection limiter latch for a deflection limiter band housed within the aircraft engine cowling to move the deflection limiter latch away from contact with an indicator paddle of an interlock mechanism; moving a lock element of the interlock mechanism that at least partially covers a cowling latch and that is coupled to the indicator paddle via a linkage assembly from a first position that prevents disengagement of the cowling latch to a second position that enables disengagement of the cowling latch, wherein the cowling latch secures a first cowling portion and a second cowling portion in a closed position, disengaging the cowling latch; and moving the first cowling portion and the second cowling portion relative to each other to open the aircraft engine cowling.

Clause 19. The method of clause 18, further comprising: disengaging a second deflection limiter latch for the deflection limiter band to move the second deflection limiter latch away from contact with an indicator paddle of a second interlock mechanism; and moving a lock element of the second interlock mechanism that at least partially covers the cowling latch and that is coupled to the indicator paddle of the second interlock mechanism via a linkage assembly from a first position that prevents disengagement of the cowling latch to a second position that enables disengagement of the cowling latch.

Clause 20. The method of clause 18, moving the lock element comprises rotating the lock element relative to the cowling latch.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An aircraft engine cowling, comprising:
    a first cowling portion and a second cowling portion moveable relative to each other between a closed position and an open position;
    a cowling latch that secures the first cowling portion and the second cowling portion in the closed position;
    a deflection limiter band;
    a deflection limiter latch moveable between an engaged state and a disengaged state for the deflection limiter band;
    an interlock mechanism that prevents disengagement of the cowling latch while the deflection limiter latch is in the engaged state, the interlock mechanism including:
        a lock element moveable between a first position that prevents disengagement of the cowling latch and a second position that enables disengagement of the cowling latch,
        an indicator paddle moveable to contact the deflection limiter latch, and
        a linkage assembly that coordinates movement of the lock element with movement of the indicator paddle.

2. The aircraft engine cowling of claim 1, wherein the interlock mechanism is a first interlock mechanism;
    wherein the deflection limiter latch is a first deflection limiter latch for the deflection limiter band; and
    wherein the aircraft engine cowling further comprises:
        a second deflection limiter latch that is moveable between an engaged state and a disengaged state for the deflection limiter band; and
        a second interlock mechanism that prevents disengagement of the cowling latch while the second deflection limiter latch is in the engaged state, the second interlock mechanism including:
            a lock element moveable between a first position that prevents disengagement of the cowling latch and a second position that enables disengagement of the cowling latch,
            an indicator paddle moveable to contact the second deflection limiter latch, and
            a linkage assembly that coordinates movement of the lock element of the second interlock mechanism with movement of the indicator paddle of the second interlock mechanism.

3. The aircraft engine cowling of claim 2, wherein the first deflection limiter latch and the first interlock mechanism are located on a first side of an interface between the first cowling portion and the second cowling portion; and
    wherein the second deflection limiter latch and the second interlock mechanism are located on a second side of the interface between the first cowling portion and the second cowling portion.

4. The aircraft engine cowling of claim 1, wherein the indicator paddle comprises a paddle arm coupled to a first end of the linkage assembly; and wherein the lock element forms a hand-operable lever coupled to a second end of the linkage assembly.

5. The aircraft engine cowling of claim 1, wherein the lock element comprises a blade or fin.

6. The aircraft engine cowling of claim 1, wherein the lock element covers at least a portion of a handle of the cowling latch in the first position; and
wherein the lock element does not cover the handle of the cowling latch in the second position.

7. The aircraft engine cowling of claim 1, wherein the lock element is rotatable relative to the cowling latch.

8. The aircraft engine cowling of claim 1, wherein the linkage assembly includes:
a first crank rotatable about an axis of rotation of the lock element;
a second crank rotatable about an axis of rotation of the indicator paddle; and
a tie rod coupling the first crank to the second crank.

9. The aircraft engine cowling of claim 8, wherein the linkage assembly converts rotation of the lock element about an axis of rotation to rotation of the indicator paddle about an axis of rotation that is angled relative to the axis of rotation of the lock element.

10. The aircraft engine cowling of claim 8, wherein the interlock mechanism further comprises:
a first adjustment mechanism that enables adjustment of an angular relationship between the lock element and the indicator paddle by adjusting a length of the tie rod; and
a second adjustment mechanism that enables adjustment of a stop position of the lock element in a first direction of rotation about the axis of rotation of the lock element.

11. An interlock mechanism for an aircraft engine cowling having a first cowling portion and a second cowling portion moveable relative to each other between a closed position and an open position, the interlock mechanism comprising:
a lock element moveable between a first position that prevents disengagement of a cowling latch that secures the first cowling portion to the second cowling portion in the closed position, and a second position that enables disengagement of the cowling latch;
an indicator paddle moveable to contact a deflection limiter latch moveable between an engaged state and a disengaged state for a deflection limiter band of the aircraft engine cowling; and
a linkage assembly that coordinates movement of the lock element with movement of the indicator paddle.

12. The interlock mechanism of claim 11, wherein the indicator paddle comprises a paddle arm coupled to a first end of the linkage assembly; and
wherein the lock element forms a hand-operable lever coupled to a second end of the linkage assembly.

13. The interlock mechanism of claim 11, wherein the lock element comprises a blade or fin.

14. The interlock mechanism of claim 11, wherein the lock element covers at least a portion of a handle of the cowling latch in the first position; and
wherein the lock element does not cover the handle of the cowling latch in the second position.

15. The interlock mechanism of claim 11, wherein the lock element is rotatable relative to the cowling latch.

16. The interlock mechanism of claim 11, wherein the linkage assembly includes:
a first crank rotatable about an axis of rotation of the lock element;
a second crank rotatable about an axis of rotation of the indicator paddle; and
a tie rod coupling a crank arm of the first crank to a crank arm of the second crank.

17. The interlock mechanism of claim 16, wherein the linkage assembly converts rotation of the lock element to rotation of the indicator paddle, wherein the axis of rotation of the indicator paddle is angled relative to the axis of rotation of the lock element.

18. A method of opening an aircraft engine cowling, the method comprising:
disengaging at least one deflection limiter latch for a deflection limiter band housed within the aircraft engine cowling to move the deflection limiter latch away from contact with an indicator paddle of an interlock mechanism;
moving a lock element of the interlock mechanism that at least partially covers a cowling latch and that is coupled to the indicator paddle via a linkage assembly from a first position that prevents disengagement of the cowling latch to a second position that enables disengagement of the cowling latch, wherein the cowling latch secures a first cowling portion and a second cowling portion of the aircraft engine cowling in a closed position,
disengaging the cowling latch; and
moving the first cowling portion and the second cowling portion relative to each other to open the aircraft engine cowling.

19. The method of claim 18, wherein the interlock mechanism is a first interlock mechanism and the at least one deflection limiter latch is a first deflection limiter latch for the deflection limiter band, the method further comprising:
disengaging a second deflection limiter latch for the deflection limiter band to move the second deflection limiter latch away from contact with an indicator paddle of a second interlock mechanism; and
moving a lock element of the second interlock mechanism that at least partially covers the cowling latch and that is coupled to the indicator paddle of the second interlock mechanism via a linkage assembly of the second interlock mechanism from a first position that prevents disengagement of the cowling latch to a second position that enables disengagement of the cowling latch.

20. The method of claim 18, wherein moving the lock element comprises rotating the lock element relative to the cowling latch.

* * * * *